US011143839B2

United States Patent
Yuan et al.

(10) Patent No.: US 11,143,839 B2
(45) Date of Patent: Oct. 12, 2021

(54) CAMERA CAPABLE OF AUTOMATICALLY COMPENSATING FOCAL LENGTH

(71) Applicant: Chicony Electronics Co., Ltd., New Taipei (TW)

(72) Inventors: Shang-Yuan Yuan, New Taipei (TW); Hsiang-Ping Liu, New Taipei (TW); Wei-De Jiang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 267 days.

(21) Appl. No.: 16/191,203

(22) Filed: Nov. 14, 2018

(65) Prior Publication Data

US 2019/0196134 A1 Jun. 27, 2019

(30) Foreign Application Priority Data

Dec. 25, 2017 (TW) .................................. 106145594

(51) Int. Cl.
*G02B 7/02* (2021.01)
*G02B 7/09* (2021.01)

(52) U.S. Cl.
CPC ............. *G02B 7/028* (2013.01); *G02B 7/021* (2013.01); *G02B 7/022* (2013.01); *G02B 7/026* (2013.01); *G02B 7/09* (2013.01)

(58) Field of Classification Search
CPC ........ G02B 7/008; G02B 7/102; G02B 13/20; G02B 15/14; G02B 27/32; G02B 27/62; G02B 7/10; H02K 41/0356; G01B 11/02; G03B 2205/0046; G03B 5/00; G06T 7/70; H04N 5/23212

See application file for complete search history.

(56) References Cited

U.S. PATENT DOCUMENTS

| 1,325,936 | A | * | 12/1919 | Fouasse | ................. | G02B 7/028 |
| | | | | | | 359/820 |
| 7,839,585 | B2 | * | 11/2010 | Hou | ......................... | G02B 7/08 |
| | | | | | | 359/824 |
| 10,054,757 | B2 | | 8/2018 | Fredriksson et al. | | |

(Continued)

FOREIGN PATENT DOCUMENTS

| CN | 101866935 B | 4/2013 |
| CN | 104101979 A | 10/2014 |

(Continued)

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

A camera capable of automatically compensating focal length includes a base, an adjust seat, and a lens barrel. The adjust seat includes a first ring, a second ring, and a connecting member. The first ring and the second ring are coaxially sleeved with each other and a distance is kept between the first ring and the second ring. The first ring includes a first end and a second end that are axially opposite to each other. The first end is fixed on the base. The second ring includes a third end and a fourth end that are axially opposite to each other. The third end is connected to the second end of the first ring via the connecting member. The fourth end has a first coupling part. The lens barrel has a second coupling part correspondingly coupled to the first coupling part.

8 Claims, 4 Drawing Sheets

(56) References Cited

U.S. PATENT DOCUMENTS

| | | | |
|---|---|---|---|
| 10,254,502 B2 | 4/2019 | Ikeda | |
| 2004/0165877 A1* | 8/2004 | Hsiao | G02B 7/08 396/85 |
| 2005/0232619 A1 | 10/2005 | Yamamoto | |
| 2009/0103195 A1* | 4/2009 | Tsai | H02K 7/14 359/824 |

FOREIGN PATENT DOCUMENTS

| | | |
|---|---|---|
| CN | 105492953 A | 4/2016 |
| CN | 106842481 A | 6/2017 |

\* cited by examiner

US 11,143,839 B2

CAMERA CAPABLE OF AUTOMATICALLY COMPENSATING FOCAL LENGTH

CROSS-REFERENCE TO RELATED APPLICATION

This non-provisional application claims priority under 35 U.S.C. § 119(a) to Patent Application No. 106145594 filed in Taiwan, R.O.C. on Dec. 25, 2017, the entire contents of which are hereby incorporated by reference.

BACKGROUND

Technical Field

The instant disclosure relates to a camera, in particular, to camera capable of automatically compensating focal length.

Related Art

Different cameras are provided on the market for different uses, for example, dashboard cameras and surveillance cameras. These cameras can be installed in the car, on the helmet, at intersections, entrances, or exits, etc., for capturing a place to be monitored.

SUMMARY

An important concern for the camera is whether the displayed image is clear enough or not. However, due to the change of temperature, the focus position of the camera known to the inventor may easily have unwanted movements. For instance, the heat generated by the operation of the camera itself may lead an increasing temperature of the components inside the camera (e.g., the lens barrel, the substrate, the circuit board), so that the components may have heat expansions. Alternatively, the increasing ambient temperature (e.g., caused by sun illumination) may also lead the increasing temperature of the components inside the camera, so that the components may have thermal expansion. These conditions may possibly result the focus position of the camera to be shifted to affect the photographic resolution of the image.

In view of this, in one embodiment, a camera capable of automatically compensating focal length is provided. The camera comprises a base, an adjust seat, and a lens barrel. The adjust seat comprises a first ring, a second ring, and a connecting member. The first ring and the second ring are coaxially sleeved with each other and a distance is kept between the first ring and the second ring. The first ring comprises a first end and a second end that are axially opposite to each other. The first end is fixed on the base. The second ring comprises a third end and a fourth end that are axially opposite to each other. The third end is connected to the second end of the first ring via the connecting member. The fourth end, with respect to the third end, is distant from the second end, and the fourth end has a first coupling part. The lens barrel has a second coupling part, and the second coupling part is correspondingly coupled to the first coupling part.

Based on the above, when a thermal source is applied to the camera according to one or some embodiments of the instant disclosure, e.g., when the camera generates heat due to the operation of the camera itself or when the camera is heated due to sun illumination, the first ring of the adjust seat can have a first axial thermal deformation and the second ring can have a second axial thermal deformation with a direction opposite to the first axial thermal deformation. Hence, the first axial thermal deformation and the second axial thermal deformation can compensate the thermal deformation of the components inside the camera (e.g., the lens barrel, the base, the circuit board). Therefore, the distance between the lens and the optical sensing member can be retained after the thermal source is applied to the camera, and the focal length for displaying an image can be maintained to keep the quality of the image.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
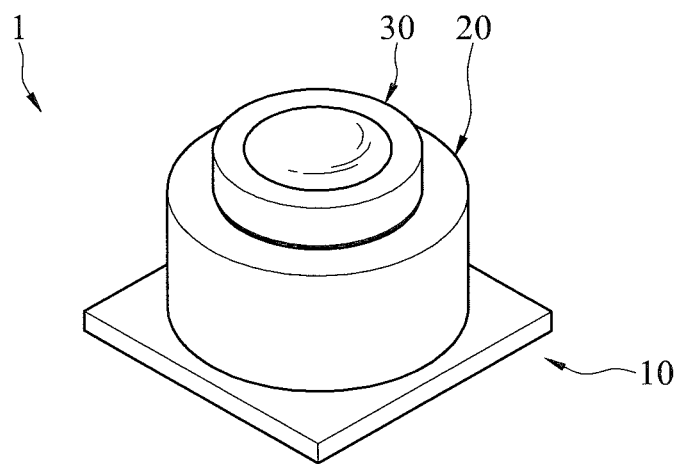
FIG. 1 illustrates a perspective view of a camera according to a first embodiment of the instant disclosure.
Figure 2:
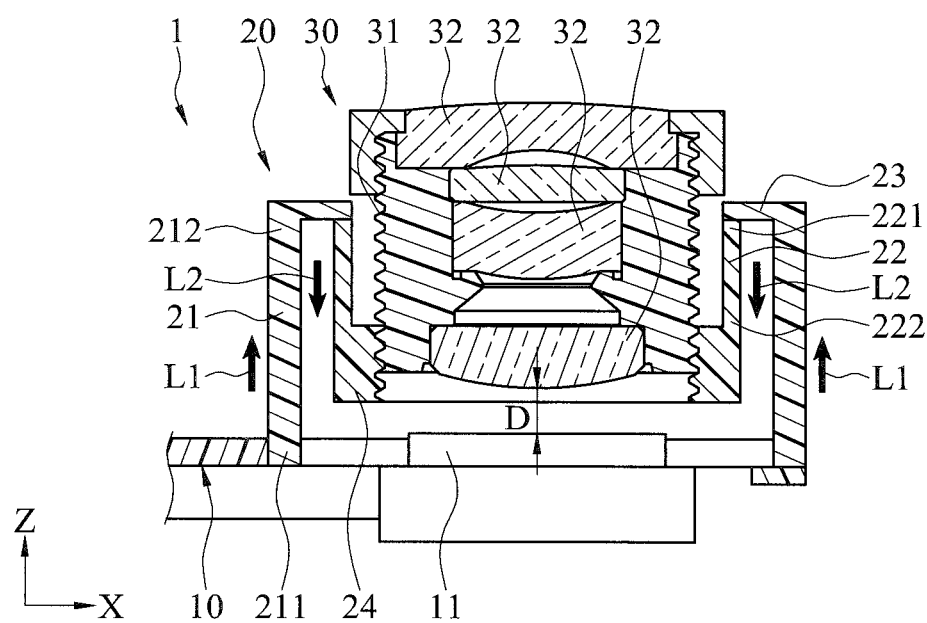
FIG. 2 illustrates an exploded view of the camera of the first embodiment.

FIG. 1 illustrates a perspective view of a camera according to a first embodiment of the instant disclosure, and FIG. 2 illustrates an exploded view of the camera of the first embodiment. As shown in FIGS. 1 and 2, in this embodiment, the camera capable of automatically compensating focal length 1 (hereinafter simplified as "camera 1") comprises a base 10, an adjust seat 20, and a lens barrel 30. In some embodiments, the camera 1 can be assembled on an electronic device. For example, the camera 1 may be a camera module of a dashboard camera, a mobile phone, a tablet, a notebook, or other handheld electronic devices. Alternatively, the camera 1 may be a surveillance camera, like an IP camera (network camera), a closed-circuit television (CCTV), or an analog surveillance camera, etc.

As shown in FIGS. 1 and 2, in this embodiment, the adjust seat 20 is on the base 10. In one embodiment, the base 10 may be holder made of plastic or metal. In this embodiment, the base 10 may comprise an optical sensing member 11. In some embodiments, the optical sensing member 11 may be a charge-coupled device (CCD), a complementary metal-oxide semiconductor (CMOS), or a CMOS active pixel sensor.

As shown in FIGS. 1 and 2, the adjust seat 20 comprises a first ring 21, a second ring 22, and a connecting member 23. The first ring 21 and the second ring 22 are coaxially sleeved with each other, and a distance (e.g., 1 mm, 2 mm, 5 mm, or 10 mm) is between the first ring 21 and the second ring 22. In this embodiment, the first ring 21 and the second ring 22 are circular rings, but embodiments are not limited thereto. In some embodiments, the first ring 21 may be a rectangular ring, an elliptical ring, or rings with other shapes, and the second ring 22 may be a rectangular ring, an elliptical ring, or rings with other shapes. Furthermore, in this embodiment, an outer diameter of the first ring 21 is greater than an outer diameter of the second ring 22, and the second ring 22 is sleeved in the first ring 21 with a distance kept between the first ring 21 and the second ring 22. That is, the first ring 21 and the second ring 22 are not in contact with each other. However, this embodiment is an illustrative embodiment, and the outer diameter of the first ring 21 may be less than the outer diameter of the second ring 22, so that the first ring 21 is sleeved in the second ring 22.

Further, as shown in FIGS. 1 and 2, the first ring 21 of the adjust seat 20 comprises a first end 211 and a second end 212 that are axially opposite to each other. The axial direction in the figures is the Y-axis direction. The first end 211 of the first ring 21 is fixed on the base 10 (for example, the first end 211 is fixed on the base 10 through gluing, threading, engaging, soldering, etc.). The second ring 22 comprises a third end 221 and a fourth end 222 that are axially opposite to each other. The fourth end 222 of the second ring 22, with respect to the third end 221, is distant from the second end 212. That is, a distance between the fourth end 222 and the second end 212 is greater than a distance between the third end 221 and the second end 212. The third end 221 is connected to the second end 212 of the first ring 21 via the connecting member 23. For example, in this embodiment, the connecting member 23 may be tubular body that is integrally formed with the first ring 21 and extending from the second end 212 of the first ring 21 in a radial direction. An end portion of the connecting member 23 distant from the second end 212 of the first ring 21 may be assembled with the third end 221 of the second ring 22. For example, the third end 221 of the second ring 22 may be fixed with the connecting member 23 via gluing, threading, engaging, soldering, etc. In other embodiments, the connecting member 23 may be integrally formed with the second ring 22 and extending from the third end 221 of the second ring 22, embodiments are not limited thereto.

As shown in FIGS. 1 and 2, the lens barrel 30 is assembled with the second ring 22 of the adjust seat 20. For example, in this embodiment, the lens barrel 30 is sleeved in the second ring 22. The fourth end 222 of the second ring 22 has a first coupling part 24, the lens barrel 30 has a second coupling part 31, and the second coupling part 31 of the lens barrel 30 is correspondingly coupled with the first coupling part 24 and assembled on an end portion of the second ring 22. As shown in the embodiment of FIG. 2, the first coupling part 24 is an inner thread portion, and the second coupling part 31 is an outer thread portion provided on an outer periphery of the lens barrel 30, for correspondingly threading with the inner thread portion. Accordingly, the threading between the lens barrel 30 and the second ring 22 allows the lens barrel 30 to be rotated relative to the second ring 22 to adjust a focal length for displaying an image. As shown in FIG. 2, in one embodiment, the lens barrel 30 comprises a lens 32, and here the lens 32 comprises several optical components. In some other embodiments, the lens 32 may comprise a single optical component, but embodiments are not limited thereto. The optical sensing member 11 of the base 10 corresponds to the lens 32. Since the lens barrel 30 can be rotated relative to the second ring 22 to adjust the relative position between the lens barrel 30 and the second ring 22, the distance between the lens 32 and the optical sensing member 11 can be changed to adjust the focal length for displaying an image, but embodiments are not limited thereto. In some other embodiments, the lens barrel 30 may be fixedly connected to the fourth end 222 of the second ring 22. For example, the lens barrel 30 is fixed on the second ring 22 through gluing, threading, engaging, soldering, etc., and illustrative figures for these embodiments are omitted.

In some embodiments, the first ring 21 and the second ring 22 may have the same coefficient of thermal expansion. For example, the first ring 21 and the second ring 22 may be made of the same material. Specifically, the first ring 21 and the second ring 22 may be made of the same metal material (e.g., copper, iron, alumina, or other alloys) or the same plastic materials (e.g., polyvinyl chloride (PVC), polypropylene (PP), polyimide (PI), or polycarbonate (PC)). Alternatively, in some embodiments, the first ring 21 and the second ring 22 may have different coefficients of thermal expansion. For example, the first ring 21 and the second ring 22 may be made of different materials. Specifically, the first ring 21 and the second ring 22 may be made of different metal materials; for instance, the first ring 21 may be made of copper and the second ring 22 may be made of iron. Alternatively, the first ring 21 and the second ring 22 may be made of different plastic materials; for instance, the first ring 21 may be made of polyvinyl chloride and the second ring 22 may be made of polyimide. In a further option, the first ring 21 is made of a metal material and the second ring 22 is made of a plastic material, such that the first ring 21 and the second ring 22 can have different coefficients of thermal expansion.

Accordingly, when a thermal source is applied to the camera 1 according to one or some embodiments of the instant disclosure, the first ring 21 of the adjust seat 20 can have a first axial thermal deformation and the second ring 22 can have a second axial thermal deformation with a direction opposite to the first axial thermal deformation. Hence, the axial thermal deformation of the rings of the camera 1 can compensate the thermal deformation of the components inside the camera 1 (e.g., the base 10, the optical sensing member 11, the lens barrel 30, or other components). Therefore, the distance between the lens 32 and the optical sensing member 11 can be retained after the thermal source is applied to the camera 1, and the focal length for displaying an image can be maintained to keep the quality of the image. Details are described in the following paragraphs.

Taking the embodiment shown in FIG. 2 as an example, supposed that, upon leaving the factory, the camera 1 already has an optimized focal length for displaying an image, e.g., the distance D between the lens 32 and the optical sensing member 11 is already optimized (here, the distance D is between the optical sensing member 11 and a bottom of the lens 32). When a thermal source is applied to the camera 1, e.g., when the camera 1 generates heat due to the operation of the camera 1 itself or when the camera 1 is heated due to the increasing ambient temperature (for example, the ambient temperature increases because of sun illumination), the components inside the camera 1 (e.g., the base 10, the optical sensing member 11, the lens barrel 30, and other components) will have thermal expansion as well as thermal deformation. Similarly, the adjust seat 20 is expanding because of the heat. Since the first end 211 of the first ring 21 is fixed on the base 10, the first ring 21 is extending in the direction indicated by the arrow L1 to have a first axial thermal deformation. Furthermore, since the third end 221 of the second ring 22 is fixedly connected to the connecting member 23 and there is a gap between the fourth end 222 of the second ring 22 and the base 10, the second ring 22 is extending in the direction indicated by the arrow L2 (which is opposite to the direction indicated by the arrow L1) to have a second axial thermal deformation. Accordingly, the first ring 21 and the second ring 22 are extending toward opposite directions, such that the thermal deformation of the components inside the camera 1 (e.g., the base 10, the optical sensing member 11, the lens barrel 30, and other components) can be compensated. Therefore, positions of the lens 32 and the optical sensing member 11 can be retained to keep the default focal length for displaying an image.

Taking the embodiment shown in FIG. 2 as an example again, according to the thermal deformation of the components inside the camera 1, the first axial thermal deformation of the first ring 21 may be the same as or different from the second axial thermal deformation of the second ring 22. When the first axial thermal deformation is to be the same as the second axial thermal deformation, the first ring 21 and the second ring 22 may have the same coefficient of thermal expansion as well as the same length, such that the first axial thermal deformation can be equal to the second axial thermal deformation. Alternatively, the coefficient of thermal expansion of the first ring 21 may be greater than the coefficient of thermal expansion of the second ring 22, while the length of the second ring 22 is greater than the length of the first ring 21, so that the first axial thermal deformation can be the same as the second thermal deformation. When the first axial thermal deformation is to be different from the second axial thermal deformation, the first ring 21 and the second ring 22 may have the same coefficient of thermal expansion but different lengths, such that the first axial thermal deformation can be different form the second axial thermal deformation. Alternatively, the first ring 21 and the second ring 22 may have different coefficients of thermal expansion as well as different lengths, so that the first axial thermal deformation can be different from the second axial thermal deformation. However, it is understood that the foregoing embodiments are provided for illustrative purposes, the axial thermal deformation of the first ring 21 and the second ring 22 is configured based on the actual thermal deformation of the components inside the camera 1, according to different embodiments.

Figure 3:
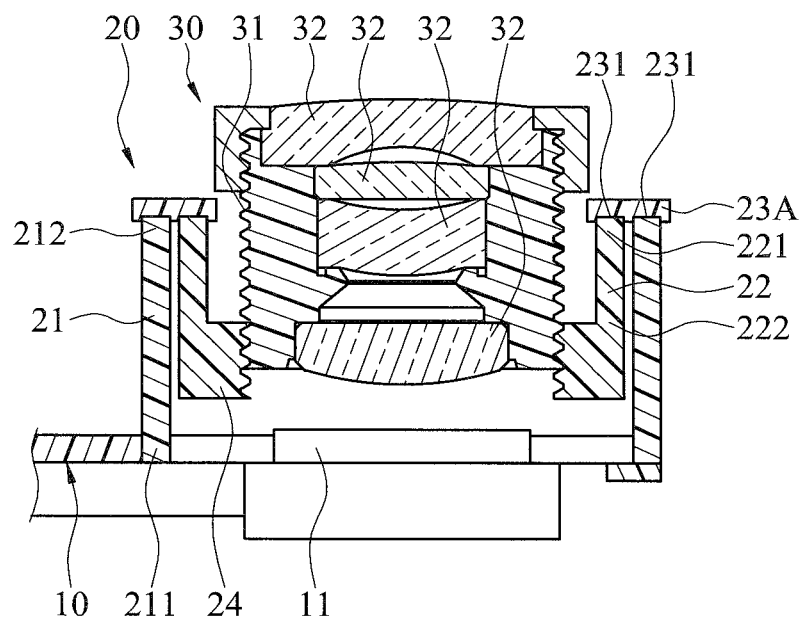
FIG. 3 illustrates an exploded view of a camera according to a second embodiment of the instant disclosure.

In some embodiments, the connecting member 23 of the camera 1 may have different configurations. For example, FIG. 3 illustrates an exploded view of a camera 1 according to a second embodiment of the instant disclosure. In this embodiment, the connecting member 23A is an individual component and fixed on an end surface of the second end 212 of the first ring 21 and on an end surface of the third end 221 of the second ring 22. Since the connecting member 23A is fixed on the end surface of the second ring 22 and the end surface of the first ring 21, the horizontal thermal deformation of the first ring 21 and the horizontal thermal deformation of the second ring 22 do not affect with each other to generate errors for the assembly. Furthermore, in this embodiment, the connecting member 23A has two grooves 231. During the assembly, the second end 212 of the first ring 21 and the third end 221 of the second ring 22 are respectively inserted into the two grooves 231. Hence, during the assembly of the camera 1, the time for components alignment can be reduced, the production efficiency can be improved, and errors for the assembly can be avoided.

Figure 4:
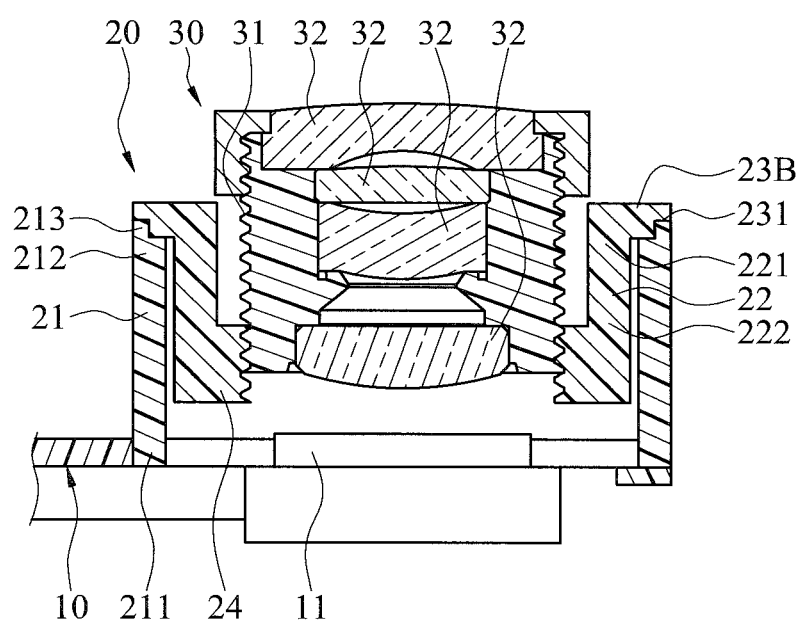
FIG. 4 illustrates an exploded view of a camera according to a third embodiment of the instant disclosure.

Alternatively, as shown in FIG. 4, FIG. 4 illustrates an exploded view of a camera 1 according to a third embodiment of the instant disclosure. In this embodiment, the connecting member 23B is integrally formed with the second ring 22 and extending from the third end 221 of the second ring 22 in a radial direction. Moreover, in this embodiment, the connecting member 23B has one groove 231. The groove 231 is at an end portion of the connecting member 23B, so that the connecting member 23B has a stepped surface. A protruding block 213 is protruding from an end surface of the second end 212 of the first ring 21, so that the end surface of the second end 212 is a stepped surface. The protruding block 213 is inserted into the groove 231, so that the contact area between the connecting member 23B and the first ring 21 can be increased and the structural strength of the assembly can be improved. In other embodiments, the connecting member 23B may be integrally formed with the first ring 21 and extending from the second end 212 of the first ring 21 in the radial direction, but embodiments are not limited thereto.

Figure 5:
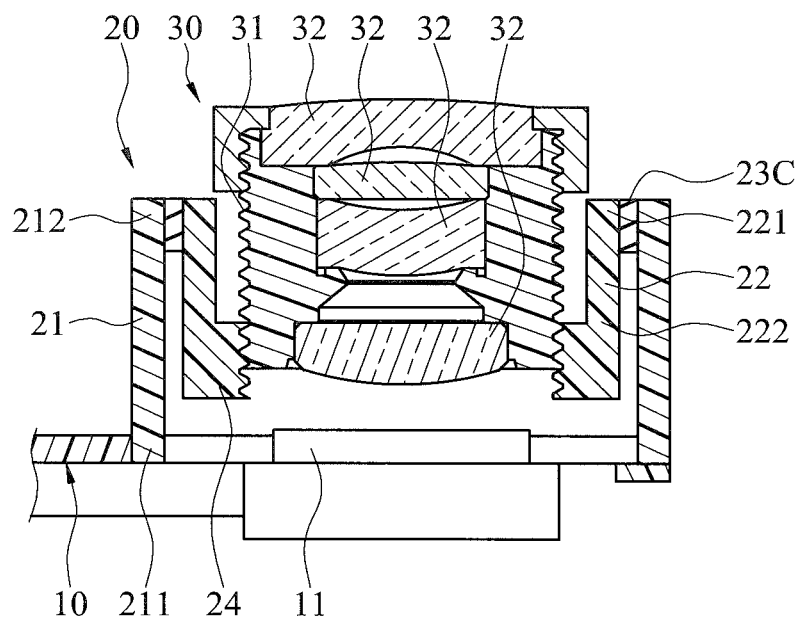
FIG. 5 illustrates an exploded view of a camera according to a fourth embodiment of the instant disclosure.

In a further option, as shown in FIG. 5, FIG. 5 illustrates an exploded view of a camera 1 according to a fourth embodiment of the instant disclosure. In this embodiment, the connecting member 23C is a tubular body and sandwiched between the first ring 21 and the second ring 22, so that a distance can be kept between the first ring 21 and the second ring 22. Furthermore, the connecting member 23C is preferably adjacent to the second end 212 of the first ring 21 and the third end 221 of the second ring 22.

Figure 6:
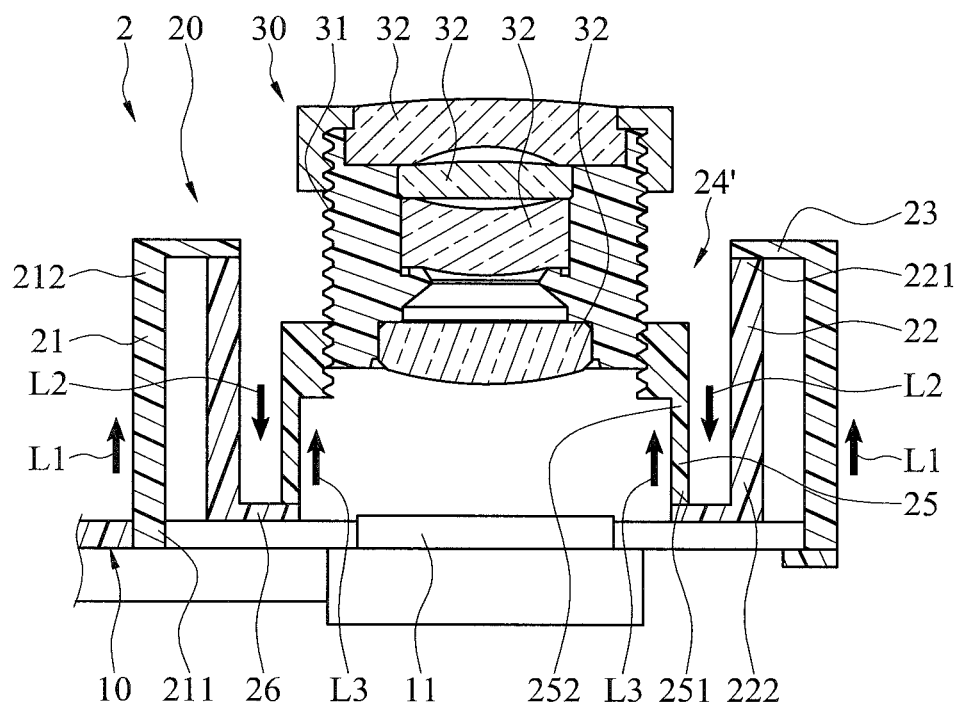
FIG. 6 illustrates an exploded view of a camera according to a fifth embodiment of the instant disclosure.

As shown in FIG. 6, FIG. 6 illustrates an exploded view of a camera 2 according to a fifth embodiment of the instant disclosure. In this embodiment, the first coupling part 24' is different from that in the first embodiment. In this embodiment, the first coupling part 24' comprises a third ring 25 and a radial connecting member 26. The third ring 25 comprises a fifth end 251 and a sixth end 252 that are axially opposite to each other. The fifth end 251 of the third ring 25 is connected to the fourth end 222 of the second ring 22 via the radial connecting member 26. The sixth end 252 of the third ring 25 is coupled to the lens barrel 30. The third ring 25 may be a rectangular ring, an elliptical ring, or rings with other shapes. In this embodiment, an outer diameter of the third ring 25 is less than that of the second ring 22, and the third ring 25 is sleeved in the second ring 22 with a distance kept between the second ring 22 and the third ring 25. Accordingly, when a thermal source is applied to the camera 2, since the fifth end 251 of the third ring 25 is fixed on the radial connecting member 26, the third ring 25 is extending in the direction indicated by the arrow L3 (which is opposite to the direction indicated by the arrow L2) to have a third axial thermal deformation. The first axial thermal deformation, the second axial thermal deformation, and the third axial thermal deformation may be different from each other. For example, the coefficients of thermal expansion of the first ring 21, the second ring 22, and the third ring 25 may be different. Accordingly, in this embodiment, the adjust seat 20 has the axial thermal deformation of the three rings (the first ring 21, the second ring 22, and the third ring 25) to retain the focal length for displaying an image. Therefore, this embodiment is suitable for a camera 2 with a more complex thermal deformation situation. For example, this embodiment is suitable for components inside a camera having non-linear thermal deformation. Alternatively, when the thermal deformation of the components inside a camera cannot be completely compensated by the axial thermal deformation of the first ring 21 and the second ring 22, the third ring 25 can be utilized to compensate the thermal deformation.

As shown in FIG. 3 again, in this embodiment, the radial connecting member 26 is a tubular block, and the radial connecting member 26 is integrally formed with the second ring 22 and extending from the fourth end 222 of the second ring 22 in the radial direction. An end portion of the radial connecting member 26 distant from the fourth end 222 of the second ring 22 may be assembled with the fifth end 251 of the third ring 25. For example, the fifth end 251 of the third ring 25 may be fixed with the radial connecting member 26 through gluing, threading, engaging, soldering, etc.

In some embodiments, the radial connecting member 26 may have different configurations. For example, the structure of the radial connecting member 26 may be the same as or similar to the connecting members 23A, 23B, 23C shown in FIGS. 3 to 5, but embodiments are not limited thereto.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A camera capable of automatically compensating focal length, comprising:
    a base;
    an adjust seat comprising a first ring, a second ring, and a connecting member, wherein the first ring and the second ring are coaxially sleeved with each other and a distance is kept between the first ring and the second ring, the first ring comprises a first end and a second end that are axially opposite to each other, the first end is fixed on the base, the second ring comprises a third end and a fourth end that are axially opposite to each other, the third end is fixedly connected to the second end of the first ring via the connecting member, the fourth end, with respect to the third end, is distant from the second end, the fourth end has a first coupling part; and
    a lens barrel having a second coupling part, wherein the second coupling part is correspondingly coupled to the first coupling part;
    wherein the first coupling part comprises a third ring and a radial connecting member, the third ring comprises a fifth end and a sixth end that are axially opposite to each other, the fifth end is connected to the fourth end of the second ring via the radial connecting member, the sixth end of the third ring is coupled to the lens barrel,
    wherein the first coupling part is an inner thread portion and the second coupling part is an outer thread portion for threading with the inner thread portion.

2. The camera according to claim 1, wherein the first ring and the second ring have the same coefficient of thermal expansion.

3. The camera according to claim 2, wherein the first ring and the second ring have the same axial length.

4. The camera according to claim 1, wherein the first ring and the second ring have different coefficients of thermal expansion.

5. The camera according to claim 4, wherein the first ring and the second ring have different axial lengths.

6. The camera according to claim 1, wherein the connecting member is fixed connected between an end surface of the second end of the first ring and an end surface of the third end of the second ring.

7. The camera according to claim 1, wherein the connecting member is between the first ring and the second ring.

8. The camera according to claim 1, wherein the connecting member has a groove, the second end of the first ring or the third end of the second ring is received in the groove.

* * * * *